Oct. 17, 1961     D. D. WEBB     3,004,783
HIGH PRESSURE PACKING MEANS
Filed Aug. 12, 1957
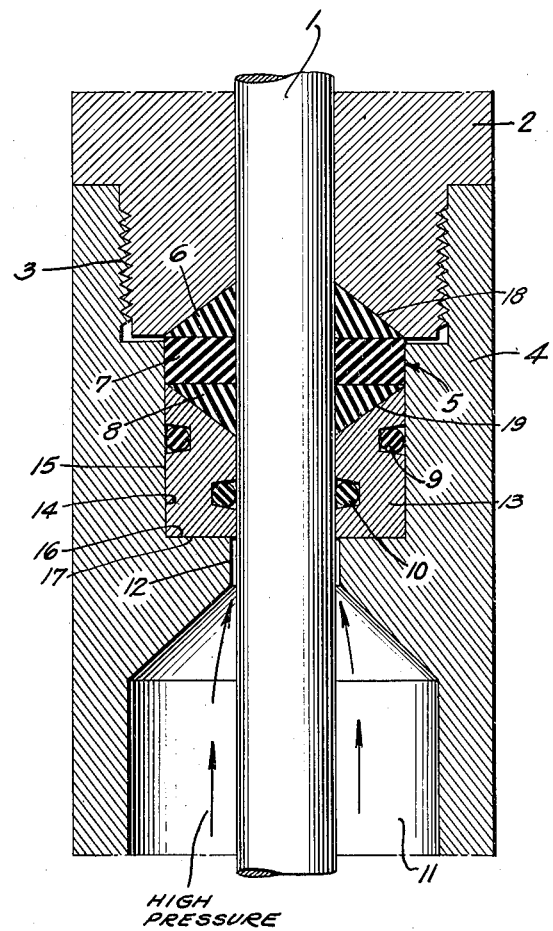
HIGH
PRESSURE
INVENTOR
DERREL D. WEBB
BY [signature]
ATTORNEY United States Patent Office 3,004,783
Patented Oct. 17, 1961

3,004,783
HIGH PRESSURE PACKING MEANS
Derrel D. Webb, Houston, Tex., assignor to Houston Engineers, Inc., Houston, Tex., a corporation of Texas
Filed Aug. 12, 1957, Ser. No. 677,480
4 Claims. (Cl. 286—12)

This invention, relating as indicated to a high pressure packing means, is more particularly directed to a means for preventing the flow of fluid under pressure along a rod, such as a piston rod, although not restricted to piston rods.

Stated broadly, it is an object of the invention to prevent the flow of fluid from a source of high pressure, such as a cylinder with a piston therein, axially along the rod. It is an additional object of the invention to produce such a means which is operable, regardless of which part moves, that is, the rod can be stationary or the cylinder can be stationary.

It has been found that where conventional seals or packing means are employed and high pressures are encountered such conventional means either leak excessively after a short period of usage or become torn or cut within a short period of time. The packing means of the present invention in regular usage has withstood extremely high pressures over unusually long periods heretofore unknown in the art.

A further object of the invention is to provide a non-creeping fluid seal which will withstand high pressures and which will operate efficiently for an extended period of time where low pressures are encountered.

A specific object of the invention is to provide a resilient, composite sealing member which is trapezoidal in cross-section and is composed of outer, hard, tough ring portions mounted upon and preferably secured to an inner, relatively soft, resilient portion.

Another specific object of the invention is to provide a metallic ring which acts as a floating piston to exert pressure on the aforesaid composite, resilient sealing member.

These and other objects will become more apparent when read in conjunction with the following detailed description and attached drawing, wherein:

The sole figure is a cross sectional view, showing the cylinder only partially, since the remainder of the cylinder need not be shown to understand the invention.

As will be seen in the drawing, rod 1, which may be a piston rod, is mounted centrally of a glandlike member 2. This member 2 can be merely a connecting member or can take any other mechanical form so long as it is adjustably connected to the cylinder 4. The glandlike member 2 is connected by means of screw threads 3 to the upper end of cylinder 4.

For convenience of description the invention will be described as being on the upper end of a cylinder, but it is to be understood that the packing means is operable in any position, that is, the rod can lie in a plane which extends in any position about an arc of 360°.

The inner end of glandlike member 2 is provided with a conically tapered recess 18 for the reception of the upper ring portion 6 of the composite resilient sealing member, generally indicated by the reference numeral 5. The composite sealing member 5 consists of laminations 6 and 8 of outer, tough, hard, resilient material and an inner ring portion 7 which is relatively softer than the outer portions 6 and 8. Thus, it will be seen that the resilient sealing member 5 comprises an annular sealing ring of trapezoidal cross-section having an internal bore adapted to fit snugly about the rod 1. The outer resilient portions 6 and 8 have what may be termed a triangular cross-section when taken radially wherein the inner member 7 has a rectangular cross-section when taken radially.

The ring portions 6 and 8 are constructed of resilient sealing material, such as neoprene or the like, of a hardness of about 100 durometer, while the intermediate rectangular, softer resilient portion 7 is of a lesser hardness or on the order of about 70 durometer. As a result of this construction, seal blow-outs are effectively prevented since the hard, outer, triangular portions will not creep under axial fluid pressure but will be moved as a unit toward one another when pressure is applied axially upon one side of the composite sealing member. As a result of such pressure an axial compression will be imposed upon the softer intermediate portion 7, which causes diametrical expansion of the portion 7 to effectively seal around the rod 1. The sealing action of this composite sealing ring is of maximum efficiency and in the field has prevented tearing and cutting which was heretofore always experienced with known seals, especially where high pressures were encountered.

Mounted below the new composite ring is a metallic annular piston or ring 13, having a conically tapered cavity 19 therein which is preferably of the same taper as the recess 18 so that the composite ring 5 may be seated in either direction. The metal ring 13 is in turn seated in a cavity defined by the axially extending cylindrical wall 14 and the transversely extending straight wall 16. The cylindrical surface 15 of the metal ring 13 fits snugly against the cylindrical surface 14 of the cavity in the cylinder 4 and likewise the flat end portion 17 of the metal ring 13 fits snugly against the transversely extending surface 16 of the cavity in the cylinder 4. In order to prevent fluid from leaking past the metal ring thereby deteriorating the resilient ring 5, outer and inner grooves are provided in the metal ring 13 so as to receive the resilient sealing O rings 9 and 10, respectively. The cylinder 4 is preferably provided with an integrally extending closure wall having an outwardly sloping fluid directing surface in the internal chamber 11, and this wall having a piston rod bore providing a restricted annular passage 12 around rod 1 in order to provide a restricted conduit for directed high pressure fluid to pass axially along the rod 1 and to act upon the metal ring 13, which in turn compresses the resilient composite ring 5, forcing the soft inner portion 7 thereof radially inward so as to seal efficiently about the rod 1.

The lower portion of cylinder 4 may take any convenient or conventional form, since it in no way affects the invention. It may contain a piston mounted on the rod 1 to place the fluid in the upper portion of chamber 11 under high pressure. On the other hand, the lower portion of the cylinder may be constructed entirely as the top portion and be provided with similar high pressure packing means.

It is to be emphasized that the tapered recess 18 in the glandlike member 2 and the tapered cavity 19 in the metal ring have been provided for a definite purpose. This tapering of the oppositely disposed recesses in such manner that the walls of the recesses flare outwardly as they proceed radially inward urges the composite ring toward and around the rod 1 so as to maintain an effective seal.

From the foregoing description, it will be seen that packing means has been provided which will stand extremely high pressures and further will stand up longer under hard usage due primarily to the fact that the composite sealing member 5 is for all practical purposes out of contact with the high pressure fluid. It will be seen that the thrust of the high pressure fluid will be taken by the metal ring 13 and thereby transmitted to the resilient ring 5 to efficiently seal about the rod 1. Thus, axial creeping of the seal is effectively eliminated and also cutting and tearing of the seal is eliminated.

The invention may be embodied in other forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A high pressure cylinder unit comprising in combination a cylinder having an end closure wall, an axially movable rod extending slidably through an axial bore in said wall, said wall having two aligned counterbores of different diameters therein opening into each other, the inner counterbore having a continuously compensating packing structure disposed therein and extending partly into said outer counterbore of larger diameter, said packing structure including a metal pressure piston of a diameter corresponding substantially to that of said inner counterbore and having a flat inner end seated on the bottom surface of said inner counterbore, said piston member having an axial bore slidably receiving said axially movable rod, packing means mounted within the outer and inner cylindrical walls of said pressure piston sealingly engaging, respectively, the cylindrical surfaces of said smaller counterbore and said axially movable rod, the outer end of said pressure piston being conically indented, a resilient, non-metallic, multi-part packing means of trapezoidal cross-section seated in said conically indented end of said pressure piston, said multi-part packing having a bore snugly and slidably receiving said axially movable rod, said multi-part packing filling the remaining space in said inner counterbore and extending to within said outer counterbore, a packing gland through which said axially movable rod extends threadedly and adjustably received in said outer counterbore and having a conically indented inner surface corresponding to and bearing against said resilient packing of the trapezoidal cross-section, said axial bore in said end closure wall being of a diameter to provide a small annular clearance for high pressure fluid to flow therethrough from said high pressure cylinder, the high pressure cylinder side of said closure wall conically sloping outwardly to direct the high pressure fluid through said small annular clearance to actuate said pressure piston member to axially compress said non-metallic, resilient packing with a force corresponding to the pressure existing with said cylinder for greater sealing efficiency.

2. The structure as defined in claim 1, wherein said non-metallic resilient packing of trapezoidal cross-section that is axially engaged for compression by said metal pressure piston comprises a ring-like layer construction having relatively hard, tough end portions of conical configuration and a relatively softer mid-section of rectangular cross-section, the conically shaped ends of said packing corresponding in slope and size to the conically indented ends of said pressure piston and said adjustable gland.

3. The structure as defined in claim 2 wherein the non-metallic resilient packing of trapezoidal cross-section is of integral laminated construction and differential softness.

4. A high pressure cylinder unit, comprising in combination, a fluid pressure cylinder having an end closure wall, a threaded counterbore of relatively large diameter located in the outer portion of said end wall, a cylindrical counterbore of lesser diameter disposed inwardly of and open to said threaded counterbore, the bottom surface of said cylindrical counterbore lying normal thereto, said closure wall having an axial bore therethrough, an axially movable piston rod extending through said axial bore of said end closure wall, said closure wall bore being of such size as to provide a small annular pressure fluid flow passage around said piston rod, the pressure cylinder side of said closure wall outwardly conically sloping toward said piston rod bore, continuously compensating packing means disposed in said cylindrical counterbore, said packing means including a cylindircal metal piston pressure member having a flat inner end seated on said bottom surface and slidably engaging the wall of said cylindrical counterbore, said piston pressure member having a central bore slidably engaging said piston rod, annular groove means disposed in the outer cylindrical surface and central bore of said piston member, resilient non-metallic sealing means disposed in each of said groove means in fluid sealing engagement respectively with said cylindrical counterbore wall and said piston rod, the end of said piston member opposite its inner end comprising a conical cavity, resilient, non-metallic, conical-ended packing means of trapezoidial cross-section and of a diameter substantially equal to that of the cylindrical counterbore seated in said conical end of said pressure piston, the upper conical end of said last-mentioned packing means extending within said threaded counterbore, a threaded packing gland slidably receiving said piston rod and threadedly engaging said threaded counterbore, the inner end of said packing gland having a conical cavity engageable with the outer end of said resilient non-metallic conically ended packing means where it is movable in pressure engagement therewith to increase its sealing engagement with said piston rod, the said outwardly conically sloping end wall surface within said pressure cylinder directing fluid under pressure through said small annular flow passage around said piston rod, whereby said packing piston member axially compresses said trapezoidal section packing means for greater sealing efficiency with a force corresponding to the pressure within said pressure cylinder, References Cited in the file of this patent

UNITED STATES PATENTS

| | | |
|---|---|---|
| 563,445 | Bryant | July 7, 1896 |
| 661,664 | Lane | Nov. 13, 1900 |
| 712,966 | Rockwell | Nov. 4, 1902 |
| 990,943 | Zimmer | May 2, 1911 |
| 1,928,259 | McCabe | Sept. 26, 1933 |
| 1,930,982 | Norris | Oct. 17, 1933 |
| 2,205,910 | Roybould | June 25, 1940 |
| 2,666,659 | Audemar | Jan. 19, 1954 |